United States Patent [19]

Frantz

[11] Patent Number: 4,861,061
[45] Date of Patent: Aug. 29, 1989

[54] TOW BAR FOR TOWING A MOTOR VEHICLE

[76] Inventor: Marvin O. Frantz, No. 3 Greenbrier Ct., Ponca City, Okla. 74604

[21] Appl. No.: 189,065

[22] Filed: May 2, 1988

[51] Int. Cl.⁴ ............................................. B60D 1/16
[52] U.S. Cl. ................................ 280/479.2; 280/491.4
[58] Field of Search ........... 280/478 A, 478 B, 478 R, 280/491 D, 491 A, 491 R, 482

[56] References Cited

U.S. PATENT DOCUMENTS

| | | | |
|---|---|---|---|
| 3,158,387 | 11/1964 | Martin | 280/478 |
| 3,281,162 | 10/1966 | Carson | 280/478 |
| 3,281,163 | 10/1966 | Wiebe | 280/478 |
| 3,384,391 | 5/1968 | Batke | 280/478 |
| 3,419,285 | 12/1968 | Morehouse et al. | 280/478 |
| 3,427,045 | 2/1969 | Hoock | 280/478 |
| 3,492,022 | 1/1970 | Hansen | 280/478 |
| 3,817,558 | 6/1974 | Eger | 280/491 D |

Primary Examiner—Charles A. Marmor
Assistant Examiner—Donn McGien
Attorney, Agent, or Firm—William J. Miller

[57] ABSTRACT

This invention is an improvement over the triangularly shaped tow bar which has the hitch connected to a towing vehicle at the apex of the triangle and the base connected to the towed vehicle with two arms extending from the apex to the towed vehicle. The improvements in the tow bar consist of constructing each of the arms so that they can be telescoped during the connecting or disconnecting phases of the tow bar and also can be automatically locked in the extended position when the towing vehicle begins to pull the towed vehicle. The telescoping portion of each of the arms on the tow bar has attached ball joint connectors at the extremity where the tow bar arms can attach to pins on a base plate, a second part of this invention to be described hereafter. These ball or swivel joints allow the tow bar to be attached or detached with ease regardless of the horizontal position of the tow bar or angle of the towed vehicle in relation to the tow bar arms.

The invention further includes a means for stowing the towing apparatus during periods of nonuse. Further, this invention includes an unique mating base plate that is attached to the towed vehicle. The base plate has an unique method for receiving the ball joint couplers and also providing points of attachment for safety cables or chains.

9 Claims, 2 Drawing Sheets

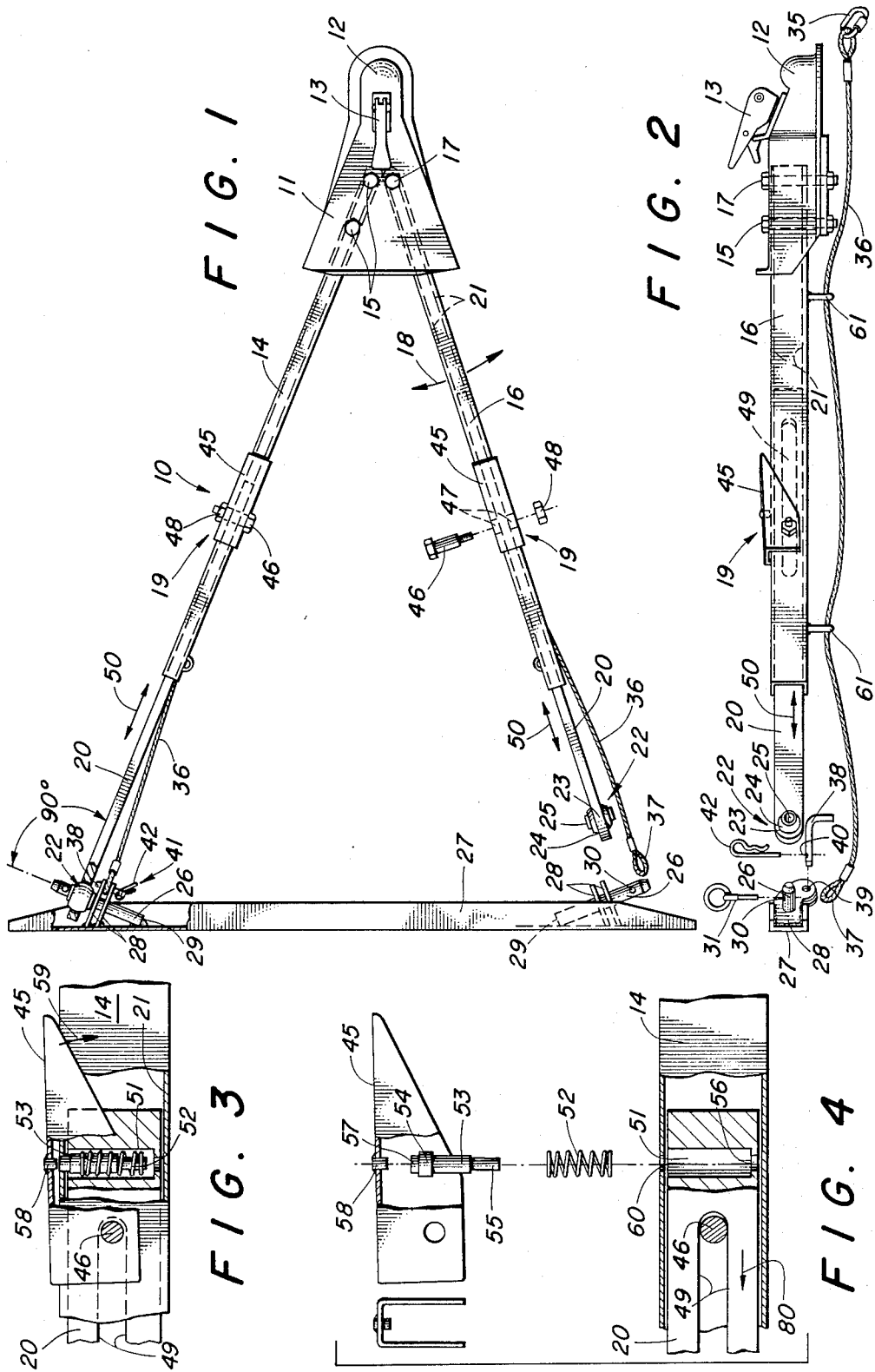

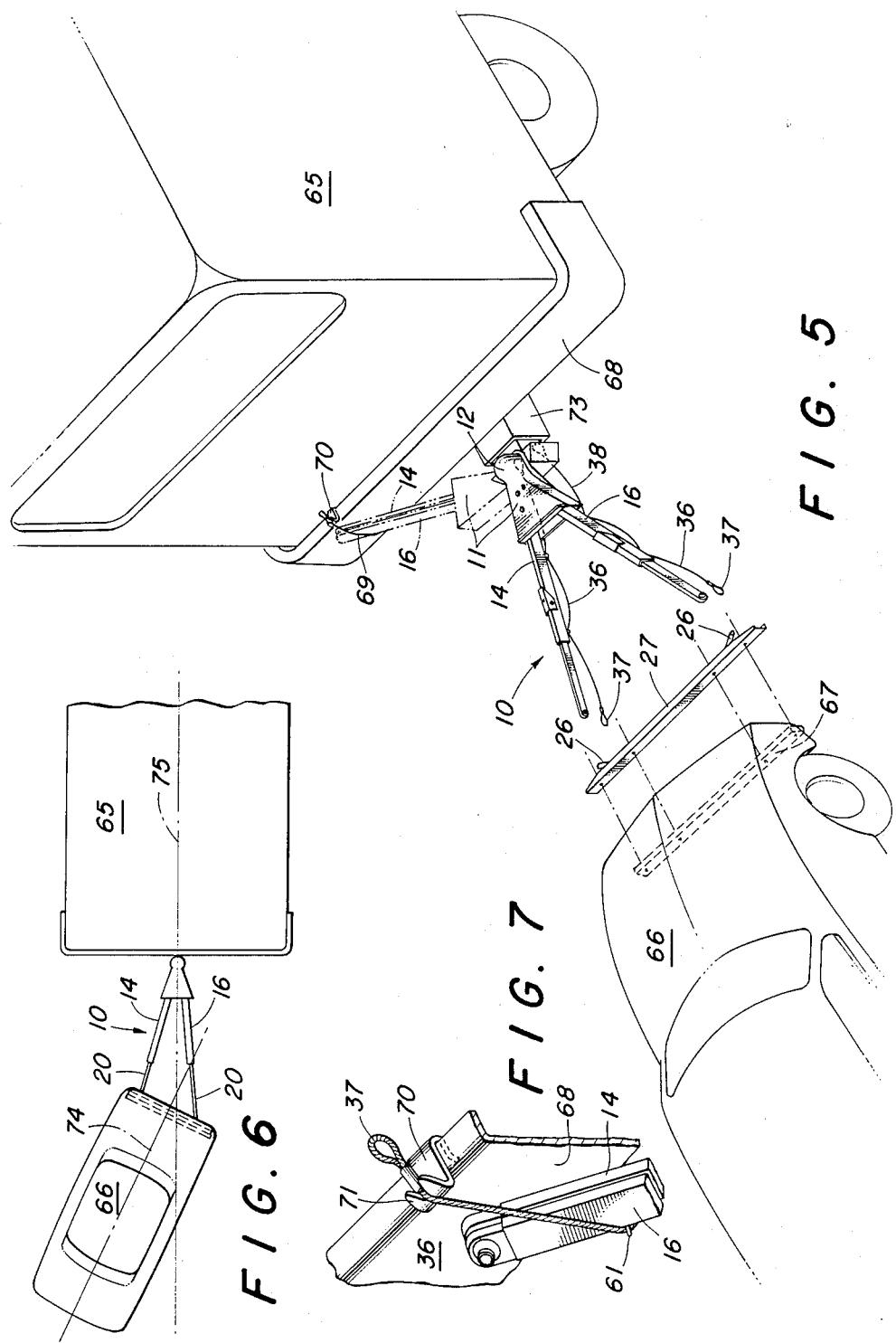

TOW BAR FOR TOWING A MOTOR VEHICLE

BRIEF DESCRIPTION OF THE PRIOR ART

The prior art is divided into two categories; one is the "V" shaped tow bar with extending arms and the second is a tow bar having an extending arm.

In the first class of patents, U.S. Pat. No. 3,281,162 to R. M. Carson shows a standard tow bar utilizing two spaced apart arms in the form of a "V". The U.S. Pat. No. 3,384,391 to E. E. Batke is another illustration of a tow bar having spaced arms in the form of a "V". Both of the above patents have rigid arms.

The second class of patents is U.S. Pat. No. 3,419,285 to E. P. Morehouse et al. which is a "V" shaped tow bar having a pair of arms which telescope. No locking means appear to be provided in this Morehouse et al. disclosure.

U.S. Pat. No. 3,427,045 to H. Hoock shows a "V" shaped tow bar arrangement having two arms, one arm of which is securely attached to the apex, while the second arm is pivotally attached to the apex. This patent does not disclose telescoping arms nor any other feature of the invention.

U.S. Pat. No. 3,492,002 to R. S. Hansen does disclose a "V" shaped tow bar having telescoping arms. However, only one of the two arms appears to contain a locking apparatus once the arm has been fully extended. Such an arrangement does not provide satisfactory towing for a heavy vehicle, but may function for the apparatus disclosed, namely a small trailer and the like. Furthermore, the apparatus would not permit the towing vehicle to backup if it became necessary during the towing operation.

BRIEF DESCRIPTION OF THE INVENTION

This invention discloses a novel "V" shaped tow bar wherein both of the arms of the tow bar are telescoping during the connecting or disconnecting process of the towed vehicle with the towing vehicle. The arms also will automatically lock in the extended position once the towing vehicle moves forward. The invention also features ball swivel joint connectors for ease of connecting or disconnecting the arms to or from the base plate of the towed vehicle so that regardless of the horizontal position of the tow bar to hitching pins on the towed vehicle or angle of the towed vehicle to tow bar, the connecting arms can be easily attached to the towed vehicle. Furthermore, the apparatus can be folded so connecting arms are parallel to each other and telescoped during nonuse periods and easily stored by fastening a cable or chain to a clip on the bumper of the towing vehicle.

BRIEF DESCRIPTION OF THE FIGURES

FIG. 1 is a top view of the tow bar and mating base plate for attaching the tow bar to the towed vehicle;

FIG. 2 is a side view of FIG. 1;

FIG. 3 is a partial cross-sectional view of the latching apparatus for each of the tow bar arms;

FIG. 4 is an expanded view of the apparatus illustrated in FIG. 3;

FIG. 5 illustrates the connection of the tow bar to the towed vehicle and illustrates the method for stowing the tow bar during nonuse;

FIG. 6 illustrates the connection of the tow bar when the towed vehicle is actually out of alignment with the towing vehicle; and, FIG. 7 illustrates in detail the method for stowing the tow bar during the period of time a vehicle is not being towed by the towing vehicle.

DETAILED DESCRIPTION OF THE INVENTION

Similar numbers will be used throughout the specifications for similar items.

Referring to all of the drawings, but in particular to FIGS. 1 and 2 the tow bar generally referred to by arrow 10 has a "V" shaped frame 11 which has a trailer hitch ball socket 12 attached at its apex. The ball socket is standard with most hitches and will not be described in this application in any detail. Hitch 12 also includes a locking mechanism 13 for preventing hitch 12 from becoming uncoupled during the towing process. Such a locking mechanism is likewise well known in the art. "V" shaped frame 10 has attached thereto a first arm 14 which is secured by a pair of bolts 15 to frame 11. Bolts 15 secure arm 14 from movement in any direction with respect to frame 11. A second arm 16 is attached by a single bolt 17 to frame 11 which permits arm 16 to move in the direction of arrow 18 about bolt 17 which functions as a pivot for arm 16. Each arm has a locking apparatus 19 which will be described when reference is made to FIGS. 3 and 4.

A second portion 20 of arm 14 or arm 16 is attached to arm 14 or 16 by telescoping portion 20 into arm 14 or 16, thus, both arms 14 and 16 must be hollow at least part of the way along its length in order to accommodate portion 20 in a manner so that portion 20 can be partially telescoped into arm 14 or as illustrated by dotted lines 21. At the end of each portion 20 is a ball socket swivel joint generally referred to by arrow 22. Ball or swivel joint 22 is an assembly which essentially comprises an outside casing and a ball interior 24 which is designed to rotate freely in casing 23. Ball interior 24 can rotate in any angular direction. Ball interior 24 has an opening 5 of a size to accommodate a pin 26 which is a part of a mating base plate which in turn is attached to the frame of towed vehicle or a bumper 27. Pin 26 in the embodiment described has a pair of attaching plates 28 which are welded to mating base plate 27 with pin 26 welded to attaching plates 28. End 29 is welded to base plate 27. Pin 26, further, has an opening 30 to accommodate a locking pin 31 (see FIG. 2). Locking pin 31 passes into opening 30 after ball swivel joint 22 has had its opening 25 pushed over pin 28 as illustrated in the assembled portion shown in FIG. 1.

Security is provided to prevent the loss of the towed vehicle in case of damage to the tow bar and by having an end 35 of a safety cable or chain 36 attached to the towing vehicle. Safety cable or chain 36 extends along both first arm 14 and second arm 16 with a looped end 37 inserted between attaching plates 28 with a pin 38 passing into opening 39 and through loop 37 in a manner to secure cable or chain 36 to mating base plate 27. A locking pin 42 passes through an opening 40 once pin 38 has been installed into opening 39, thereby, securing pin 38 from accidently being dislodged during the towing operation, either through vibration or other causes. Such assembly is clearly shown as illustrated by arrow 41 of FIG. 1.

Referring to FIGS. 1, 2, 3 and 4, the locking and release mechanism for portions 20 will be further described with reference to arrow 14. The apparatus is identical for arm 16. The release and locking apparatus essentially comprises a release lever 45 which is pivotally connected to arm 14 through a bolt 46 which passes through an opening 47 in arm 14 (see FIG. 1) and is secured by a nut 48. In order to accommodate telescoping of arm 14, a slot 49 is provided in portion 20 so that the arm can be moved longitudinally as illustrated by arrow 50, thus, telescoping portion 20 into or out of arm 14 or 16.

Referring in particular to FIGS. 3 and 4, the locking mechanism used in arm 14 is illustrated in detail. Telescoping portion 20 contains a vertical opening 51 which accommodates a biasing spring 52 and a locking pin 53. Locking pin 53 has a shoulder 54 at its upper end and a reduced portion 55 at its lower end. Reduced portion 55 fits into a reduced diameter opening 56 and functions as a bearing for pin 53. Shoulder 54 rides on the wall of opening 51 and likewise acts as a bearing for pin 53 as well as an upper shoulder for biasing spring 52. Telescoping arm 14 has an opening 60 which accommodates a reduced portion 57 of pin 53. Release lever 45 has a pin 58 which is axially aligned with vertical opening 51 in a manner so that when release apparatus 45 is depressed in the direction of arrow 59, pin 58 will strike the top of locking pin 53, depressing locking pin 53 against spring 52 which will remove reduced portion 57 out of opening 56, thereby permitting longitudinal movement of portion 20 as indicated by arrow 50. A bracket 61 which can be an "U" shaped bracket is welded or attached in some manner to the underside of arms 14 and 16 to provide confinement of cable 36.

One important requirement of this invention for proper and satisfactory operation is that the axis of pin 26 be 90° to arm 14 or 16 once attached. The reason is that if pin 23 is not substantially 90 to towing arm 14 or 16, then as the vehicle is towed forward or pushed rearward, ball socket 22 will either be forced to the outside or inside of pin 23 causing undue force on either locking pin 31 or ball joint 22 during the maneuvers of towing vehicle 65. When the angle is 90°, then regardless of the movement of the towing vehicle either forward or backwards, the force will always be directly against pin 19 and no side forces will be generated on ball joint 22 or pin 23 by any maneuvers by towing vehicle 65.

Referring to FIGS. 5, 6 and 7, the connection of the towing apparatus to a vehicle is illustrated. A towing vehicle 65 is coupled through tow bar 10 to a towed vehicle 66. Mating base plate 27 is bolted or secured to towed vehicle 66 as illustrated by the dotted base plate location 67. This is generally accommodated by either attaching brackets from frame of towed vehicle to base plate 27 or attaching to the existing bumper. Towing vehicle 65, likewise, has a bumper 68 which provides a means for stowing towing apparatus 10 when unused. Such accommodation is accomplished by hooking safety cable or chain 36 to bumper 68 by using a hooking mechanism 70 in the top of bumper 68. Hooking mechanism 70 can be welded, bolted or merely pressure connected as illustrated in FIG. 7 to bumper 68. Hooking mechanism 70 has a slot 71 for securing cable or chain 36. Both of the arms 14 or 16 have one or more loop or "U" shaped brackets 61 attached underneath for the purpose of passing safety cable or chain 36 through brackets 61 during the towing operation. Cable or chain 36, during the stowing operation, has its looped end 37 slid into notch 71 in the manner illustrated in FIG. 7.

"U" shaped bracket 61 primarily functions to prevent arm 14 or 16 from slipping from the stowed position. Other methods for stowing the arm can be easily accommodated.

OPERATION

The operation of the improved towing bar is as follows: if the towing bar is not in an assembled position, then socket 12 (see FIG. 1) is placed over the ball on a hitch 73 which is already attached to vehicle 65. The ball is not illustrated, but is well known in the art. Once socket 12 is placed over the ball, then locking mechanism 13 is closed, thereby securing the socket to the ball on hitch 73. Regardless of the position of the vehicle, as illustrated in FIG. 6, with axis 74 of vehicle 66, for example, at an angle to axis 75 of vehicle 65, hitch 10 can be easily coupled to towed vehicle 66. Furthermore, the horizontal position of towed vehicle base plate 27 can also be easily accommodated by hitch 10 even if tow bar arms are not in alignment with base plate 27. This feature makes for easy connecting and disconnecting of the bar from the towed vehicle.

The first step is to attach tow bar to towing vehicle via ball hitch in the connection of tow bar 10 is to press release lever 45 on both arms 14 and 16 and telescoping portions 20 a substantial distance into arms 14 and 16. Vehicle 66 should then be driven toward vehicle 65 by a length less than the total extension length of arm 14 or 16. Once the above is accomplished, arm 20 is extended until opening 25 in ball swivel socket 24 is aligned with pin 26. It should be understood that even though arm 14 is completely secured to frame 11, that arm 14 can be easily pivoted to accommodate the connection to pin 26 by pivoting the entire frame about socket and ball 12. Opening 25 can easily be rotated axially to align itself with pin 26. Once the alignment is accommodated then opening 25 is slipped over pin 26. Locking pin 31 is then inserted into opening 30. Cable 36 then has its looped end 37 inserted between attaching plates 28 and around opening 39. Pin 38 is then passed through opening 39 and loop 37, and locking pin 42 is slipped into opening 40 to completely secure pin 38 into opening 39. Cable 36 is secured to the towed vehicle. It is assumed that cable or chain 36 is not already connected to towing vehicle 65, that such should be accomplished.

Portion 20 of arm 16 is then extended with arm 16 being pivoted about bolt 17 to accommodate the position of mating base plate 27 and pin 26 in a manner so that opening 25 can pass over pin 26. Opening 25 is then slid fully onto pin 26 and against attaching plates 28. As previously discussed, locking pins 31 are then inserted and cable 36 installed in the same manner.

RELEASE-LOCKING MECHANISM

The release-locking mechanism as fully described in FIGS. 3 and 4 and functions in the following manner: if portion 20 is to be telescoped into arm 14, then release lever 45 is depressed in the direction of arrow 59 which drives pin 58 against pin 53; depressing pin 53 against biasing spring 52. Normally the installers hand will grasp released lever 45 by placing the palm of the hand on top of release lever 45 and the fingers under arm 14, keeping pressure against pins 58 and 53. Arm portion 20 is then easily telescoped into arm 14.

The apparatus shown in FIGS. 3 and 4 will provide an automatic locking feature once the towing vehicle proceeds forward, since the biasing spring 52 will be urging pin 53 in an upward direction toward opening 56. As arm portion 20 proceeds in the direction of arrow 80 (see FIG. 4), opening 56 will eventually pass over reduced portion 57 of pin 53. When such occurs, reduced portion 57 of pin 53 will be forced by spring 52 into opening 56 locking further movement in the direction of arrow 80 by portion 20. Both arms will eventually lock when towing vehicle 65 moves forward.

CONCLUSIONS

A substantially improved towing apparatus has been described which can accommodate connecting or disconnecting at any location of the towed vehicle with respect to the towing vehicle; whether the towed vehicle is out of alignment axially with the towing vehicle or out of alignment horizontally with the towing vehicle. The axial misalignment can be easily accommodated by the telescoping feature and locking feature of both towing arms along with rotation of the ball socket swivel joint to line up with the mounting pins on the base plate. The horizontal misalignment by the towed vehicle can easily be accommodated by the rotation of the tow bar at the ball hitch on the towing vehicle and the ball swivel joints on the telescoping arms for easy attachment to the pins on the towed vehicle. In view of the above, a substantial improvement in the "V" typed hitch is disclosed.

It is obvious, of course, that other modifications can be made and still be well within the spirit and scope of this invention as described in the specification and appended claims.

What I claim is:

1. In a towing device for attachment between the rear end of a towing vehicle and the front end of a towel vehicle and wherein said towing device comprises a pivotal attachment between said towing vehicle and said towing device with first and second arms having one end closely attached to said pivotal attachment and the remaining ends attached to said towed vehicle at attachment locations with said attachment locations spaced apart on said towed vehicle, an improved towing device comprising;
    (a) said first and second arms including first and second telescoping portions, respectively;
    (b) first and second securing means mounted on said first and second arms, respectively, configured to engage said first and second telescoping portions so that when either said first or second securing means is released, the length of said telescoping portions can be shortened to facilitate attachment of said arms to said attachment location on said towed vehicle regardless of the alignment of said towed vehicle with respect to said towing vehicle;
    means carried by said first and second securing means for automatically locking said first and second securing means when each of said first and second telescoping portions have extended to a predetermined length so that when said towing vehicle moves forward, said telescoping portions will lengthen until said predetermined length is reached wherein said first and second securing means will lock said first and second telescoping portions; and,
    (d) swivel means comprising a ball joint means and mating pin means attaching said remaining ends of said first and second arms at said spaced location on said towed vehicle, said mating pin means being attached to said towed vehicle so that the axis of each of said mating pin means is 90° degrees to the axis of each of said first and second arms when said arms are attachment to said mating pin means.

2. Apparatus as claimed in claim 1 wherein said first and second telescoping arms comprise:
    a first tubular means with a second member dimensioned to slidably fit inside said first tubular member and wherein said releasable securing means comprises an opening through said first tubular means; a pin means axially slidably mounted in said second member and extending out of said second member into said opening in said first member in a manner to lock said second member from sliding along said first tubular means; and, bias means for continually using said pin means toward said opening; release means pivotally attached to said first tubular means, said release means including means for engaging said pin means and urging said pin means against said bias and out of said opening thereby permitting movement of said second member with respect to said first tubular means.

3. Apparatus as claimed in claim 1 wherein said spaced attachment locations comprise pins extending at an angle from said towed vehicle and wherein said remaining end of said arms includes a multi-axial joint having an opening therethrough adapted to receive said pin and means for locking said joint to said pin.

4. Apparatus as claimed in claim 3 wherein said multi-axial joint comprises a ball and a socket confining said ball and wherein said socket is attached to said remaining end of said arms and wherein said opening passes through said ball.

5. Apparatus as claimed in claim 2 wherein said release means comprises an "U" shaped handle means pivotally mounted at one end over said first tubular means and extending over said opening, and a pin mounted in said handle means at a location over said opening in a manner to enter said opening when said handle means is pressed toward said opening; whereby when said handle means is depressed, said pin will enter said opening means and force said slidably mounted pin out of said opening thereby releasing said second member to slide freely inside said first tubular means.

6. In a towing device for attachment between the rear end of a towing vehicle and the front end of a towed vehicle and wherein said towing device comprises a pivotal attachment between said towing vehicle and said towing device with first and second arms having one end attached to said pivotal attachment and the remaining ends attached to said towed vehicle at attachment locations with said attachment locations spaced apart on said towed vehicle, an improved towing device wherein;
    (a) each of said arms comprise first and second telescoping members, said second telescoping member including an opening therethrough;
    (b) pin means slidably mounted in said first telescoping member and extending into said opening in said second telescoping member;
    (c) bias means for continually urging said pin means into said opening;
    (d) release means pivotally mounted at one end on said second telescoping member with said remaining end including means for forcing said pin means out of said opening;
    (e) means for rigidly attaching one of said arms and pivotally attaching said remaining arm in juxtaposition at an attachment location on said towing vehicle;

(f) first and second attachment means mounted and spaced apart on said towed vehicle; and, (g) mating means attached to said remaining ends of said arms, said mating means and said attachment means including a pin and a ball and socket joint to permit attachment of said arms to said towed vehicle regardless of the horizontal orientation of said towed vehicle;

whereby said mating means provides coupling of said arms to said towed or towing vehicle regardless of the horizontal position of one vehicle with respect to the position of the other vehicle and said telescoping arms permit coupling of said arms regardless of the axial position of said towed vehicle with respect to said towing vehicle.

7. Apparatus as claimed in claim 8 wherein the axis of said pin is substantially 90° to the axis of said mating arm.

8. Apparatus as claimed in claim 6 wherein said towing device can be stored on said towing vehicle including a clip means attached to said towing vehicle said clip means spaced from said pivotal attachment, said clip means including a slot for receiving a cable means which is wrapped around said telescoped rods.

9. Apparatus as claimed in claim 1 wherein said towing device can be stored on said towing vehicle including a clip means attached to said towing vehicle said clip means spaced from said pivotal attachment, said clip means including a slot for receiving a cable means which is wrapped around said telescoped rods.

* * * * *